United States Patent
Gustafsson

(10) Patent No.: US 6,374,088 B1
(45) Date of Patent: Apr. 16, 2002

(54) ARRANGEMENT AT A MOBILE TELEPHONE

(75) Inventor: Per Gustafsson, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/228,651

(22) Filed: Jan. 12, 1999

(30) Foreign Application Priority Data

Feb. 10, 1998 (SE) .............................................. 9800373

(51) Int. Cl.[7] .............................. H04B 1/38; H04B 1/08; H04M 1/00
(52) U.S. Cl. .......................... 455/90; 455/550; 455/347; 455/575; 379/433; 379/447
(58) Field of Search ................................. 345/104, 156, 345/168, 169, 173; 341/22, 23; 379/433, 447; 455/550, 90, 556, 347, 575, 128; D14/193, 138, 315, 345, 250, 248, 440, 318, 319, 341, 342; 340/7.21, 7.63; 361/814, 815

(56) References Cited

U.S. PATENT DOCUMENTS

| | | | |
|---|---|---|---|
| 4,291,475 A | | 9/1981 | Schoemer ..................... 40/338 |
| 5,113,435 A | | 5/1992 | Chen ........................... 379/441 |
| 5,303,291 A | * | 4/1994 | Takagi ........................ 379/433 |
| 5,465,401 A | * | 11/1995 | Thompson ................... 455/558 |
| 5,655,018 A | | 8/1997 | Estevez-Alcolado de Holl et al. ............................................... 379/433 |
| 5,664,013 A | | 9/1997 | Rossi ........................... 379/428 |

FOREIGN PATENT DOCUMENTS

| | | | |
|---|---|---|---|
| EP | 0120418 A1 | * 3/1984 | ........... H04M/1/02 |
| EP | 0 275 996 | 7/1988 | |
| EP | 0 492 748 | 11/1991 | |
| EP | 0 492 747 | 7/1992 | |
| GB | 2 252 219 | 7/1992 | |
| GB | 2 235 371 | 11/1998 | |
| JP | 5030166 | 2/1993 | |

OTHER PUBLICATIONS

Translation of German Patent Doucument No. EP 0275, 996.*

* cited by examiner

Primary Examiner—Dwayne Bost
Assistant Examiner—Raymond B. Persino
(74) Attorney, Agent, or Firm—Burns, Doane, Swecker & Mathis, L.L.P.

(57) ABSTRACT

Arrangement in connection with an at least partly transparent pivotable protective hatch or flip for a mobile telephone apparatus. The flip is arranged to physically cover at least part of a keypad on the apparatus for preventing inadvertent keypad commands. The flip includes devices at its rear side, i.e. the side that in a closed state thereof is located closest to the keypad, that permit a protected attachment or arrangement of personal customization, such as paintings, sticky or nonsticky labels or cards thereat. The customization will thereby also be visible from the outside of the flip when the flip is in its closed state, due to the at least partial transparency of the flip.

10 Claims, 2 Drawing Sheets

ARRANGEMENT AT A MOBILE TELEPHONE

This application claims priority under 35 U.S.C. §§ 119 and/or 365 to 9800373-4 filed in Sweden on Feb. 10, 1998; the entire content of which is hereby incorporated by reference.

BACKGROUND

The present invention relates generally to mobile telephone apparatuses and more specifically to an arrangement in connection with a pivotable protective hatch or flip for a mobile telephone, said flip being arranged to physically cover at least parts of a keypad thereon for inter alia preventing inadvertent keypad commands.

Mobile telephones provided with such a flip or a hatch, for covering a key pad thereon, have been used by certain manufacturers for some years. The main purpose with such a flip—being to protect said keypad from inadvertent manipulation—has by other manufacturers been tackled electronically through the use of key pad locks, being initiated by inserting a certain code by using the keypad.

In some applications, such as according to EP-A2-492747, such flips have been used also as a stand for placing the telephone in an upright position e.g. on a table, thereby making it easier to observe.

Another application of such a flip has been to protect a display unit on such a telephone from becoming scratched and worn when carried in for example a pocket. According to JP-A-5 030 166 the flip is either partially transparent or provided with a window in order to provide for this function.

Hitherto, however, flips on mobile telephones have generally been arranged for the protection of the keypad. In some cases such flips have been made available in more fashionable customized versions. The main reason for the success with such customized versions has probably been that a customized version is easier to recognize as your own together with other mobile telephones of an equally looking kind lying on e.g. a conference table.

In order to achieve an industrial applicability from such customization, the number of articles that has to be produced in each batch of a kind of customized version has to be large. Thus, the above mentioned recognition problem remains.

To obtain a customization, also different kinds of stickers have been suggested. Stickers are however messy in that they require an absolutely clean surface in order to stick where they are initially applied. Even if correctly applied, the appearance of such stickers becomes less attractive due to wear as time goes by. Consequently this is not a solution that is very suitable in the long run.

SUMMARY

It is therefore an object of the present invention to provide a mobile telephone apparatus with improved means for customization as well as with means for presentation of specific, personal or otherwise necessary information to get maximum performance from available functions within the telephone itself or the net that it is connected to.

To meet this object a flip of a mobile telephone apparatus comprises means at its rear side, i.e. the side that in a closed state thereof is located closest to the keypad, permitting a protected attachment or arrangement of personal customization, such as paintings, sticky or nonsticky labels or cards thereat. Such customization might in the closed state of said flip, due to a possible at least partly transparency thereof, be visible from the outside of the flip.

To increase the durability of the customization as such when the telephone is frequently used, especially when it is constituted by a painting or a sticky label, the flip may comprise two main parts. One of these parts is the one visible to the user of the telephone when the flip is closed, the other is the one visible after opening the flip and looking in the direction of the keypad. At least one of said parts is at least partly transparent and is detachable, at least when the flip initially is brought into use.

Users of mobile telephone services today have all kinds of possibilities available within the realm of a telephone subscription. In order to make use of these possibilities, these people, however, normally have to remember different kinds of code combinations by, making use of amongst others the well known signs * and #. Bearing in mind that people today have to remember all kinds of other such codes to gain access to different services in society, the present invention is a relief in that it presents means for making it possible to, conveniently add personal information at the rear side of the flip that might lower the stress level of these people. The details of this advantage will be discussed more in detail below.

BRIEF DESCRIPTION OF THE DRAWINGS

Certain preferred embodiments of the invention will be described in more detail below under referring to the enclosed drawings, embodiments thereof, in which.

DETAILED DESCRIPTION

Figure 1:
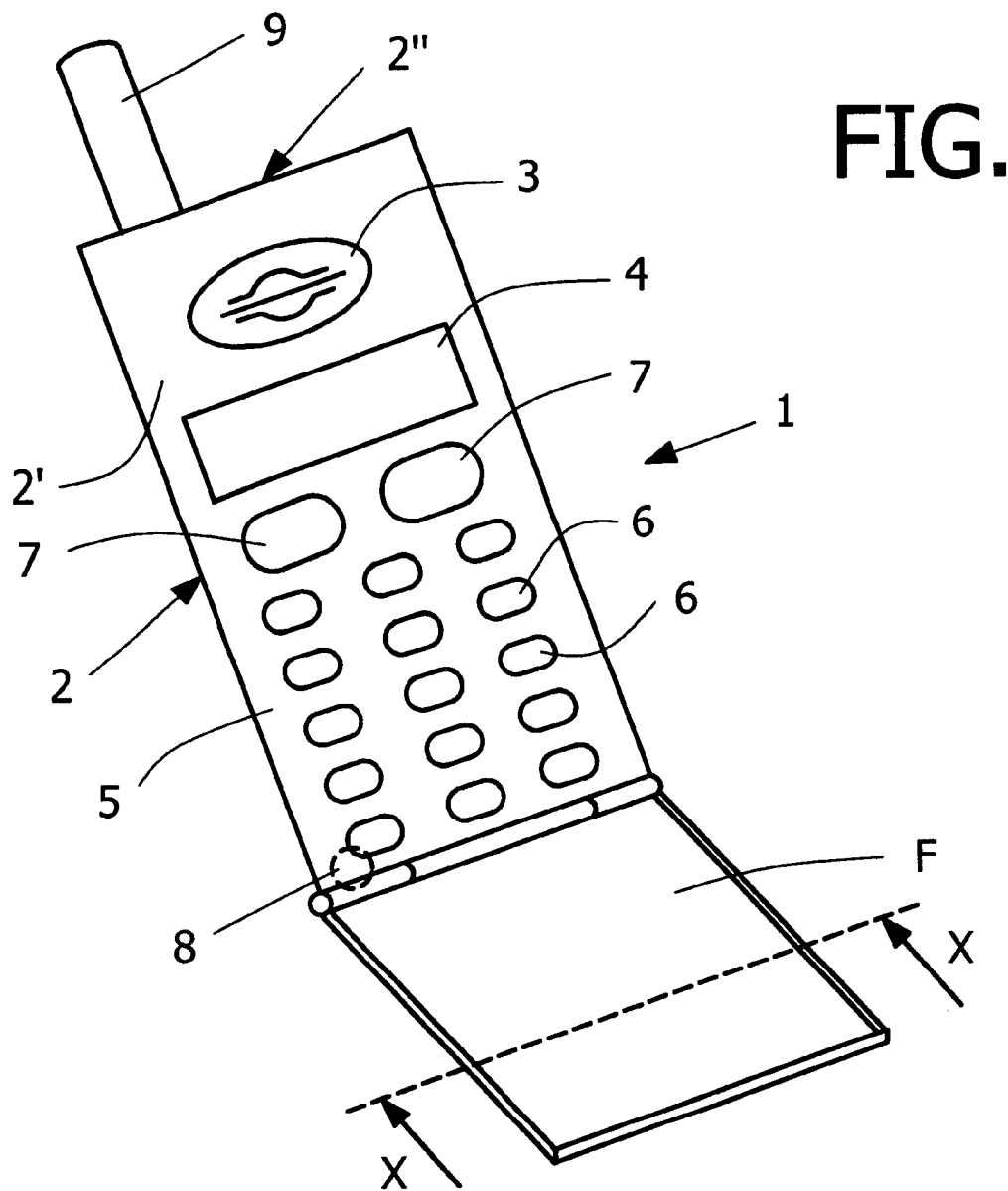
FIG. 1 is a general perspective view of a mobile telephone having a flip for protecting its keypad.

In FIG. 1 a conventional "flip type" mobile telephone apparatus 1 is shown including a housing 2, which at its front side 2' has an earpiece 3, a display 4, a keypad 5 with conventional buttons 6 for dialing and functional buttons 7, such as on/off, send, clear, etc., and a microphone 8, and on a top side 2" of the housing 2 an antenna 9. In particular, FIG. 1 shows a flip F of the kind that the present invention relates to.

Figure 2:
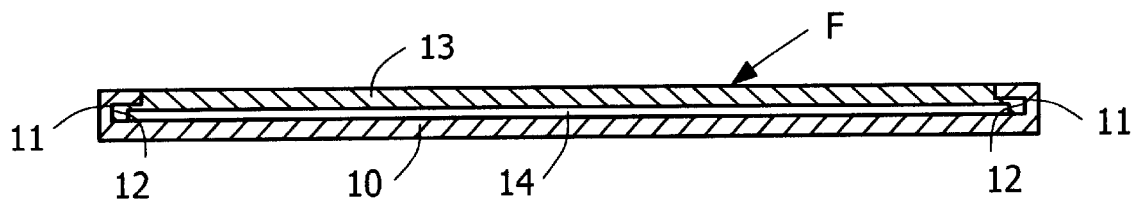
FIGS. 2–5 are slightly enlarged and simplified cross-sections along the line X—X in FIG. 1 through a flip according to the invention in different embodiments.

In FIG. 2 an embodiment of a flip F of the general kind shown in FIG. 1 is illustrated in a simplified but anyhow more detailed manner. A lower portion 10, having lateral hook-shaped edges 11, is made of a plastic material with a sufficient structural rigidity and is to be pivotally attached to the mobile telephone housing 2. The hook-shaped edges 11 define slots 12, into which a likewise plastic, correspondingly shaped cover plate 13 can be slid. The portion 10 and the plate 13 constitutes two main portions of the flip F. Between the portion 10 and the cover plate 13 a space 14 is defined in which a sticker or a card can be inserted. Either the portion 10 or the plate 13, or both, may be made of a transparent material, and accordingly such a sticker or card which may be provided with different messages or informative material on its sides providing either a pleasant customized design or purely informative material, may be visible from either side or both sides.

Figure 3:
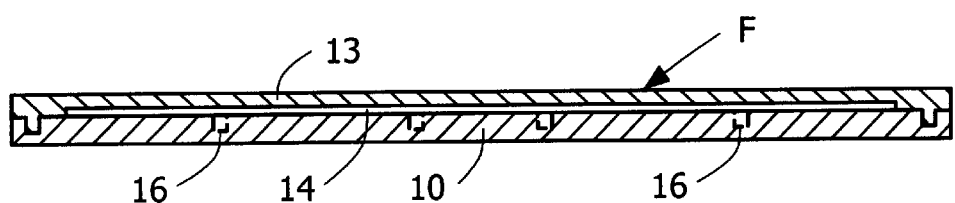
Figure 4:
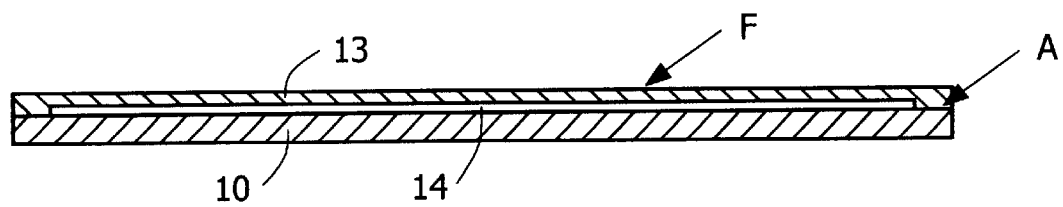

FIG. 3 and 4 show two different embodiments of a flip F with the possibility of making either or both sides of the flip F transparent in order to make it possible to customize the flip F in a way pleasant to the human eye. In the embodiment according to FIG. 3 the mutual attachment between the cover plate 13 and the lower portion 10 is effected by snap attachment means 16. The attachment may in this embodiment as well as in the other embodiments be permanented with the aid of an adhesive or glue. This may give the advantage that the telephone must be brought to a dealer to be disassembled if a sticker or card is to be changed for a new one. In case of theft this gives the advantage that the true owner of the telephone may be identified. Another advantage with the use of an adhesive or glue is that it provides a greater structural rigidity to the flip as compared with a flip in two detachable parts.

In FIG. 4 a more simplified embodiment is shown, requiring a strong adhesive agent A between the cover plate 13 and lower portion 10 of the flip. As before a sticker or a card is to be placed in a space 14 between the plate and the lower portion.

Figure 5:
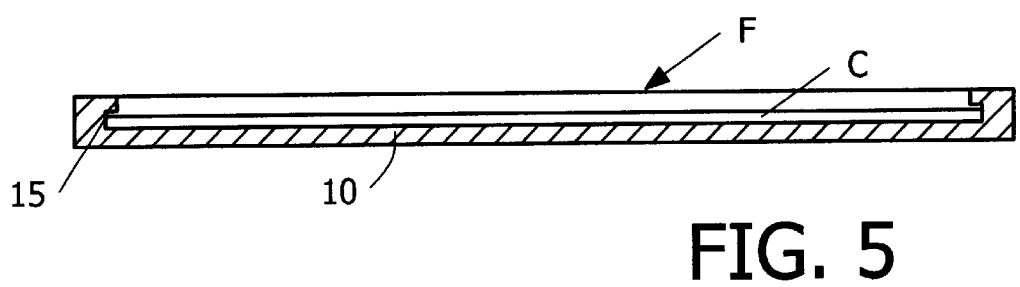

Finally, FIG. 5 shows an even more simplified embodiment. Here the flip F comprises only the lower portion 10 able to contain simply a card C. The card can be standardized dimensions, e.g. the size of a customary credit card, and can fit in means, e.g. slots 15 created along the sides of the flip.

It appears that the flip F can be of different designs. It should be specifically mentioned that the purpose is to enable the buyer of such a mobile telephone to customize it as he or she likes. The material of the flip is to be such (preferably a mixture of PC and ABS) that it will be paintable so that painting on the rear side of a transparent plastic will give a pleasant smooth exterior whatever structure the painted motive has.

What is claimed is:

1. A portable communication apparatus having a keypad and a protective pivotable flip, the flip being arranged to physically cover at least a part of the keypad for preventing inadvertent keypad commands, wherein said flip comprises a first portion having a transparent area and a second portion having a transparent area, the second portion of the flip being displaced from the first portion to define therebetween an internal space adapted to accommodate a personal customization element so that the element is visible through the transparent areas.

2. The portable communication apparatus according to claim 1, wherein the portable communication apparatus is a mobile telephone.

3. The portable communication apparatus according to claim 1, wherein the customization element is a card.

4. The portable communication apparatus according to claim 1, wherein the customization element is a sticker.

5. The portable communication apparatus according to claim 1, wherein the first portion includes opposing lateral hook-shaped edges that define slots for receiving corresponding edges of the second portion.

6. A protective pivotable flip for a portable communication apparatus having a keypad, the flip being arranged to physically cover at least a part of the keypad for preventing inadvertent keypad commands, wherein the flip comprises a first portion having a transparent area and a second portion having a transparent area, the second portion of the flip being displaced from the first portion to define therebetween an internal space adapted to accommodate a personal customization element so that the element is visible through the transparent areas.

7. The protective pivotable flip according to claim 6, wherein the portable communication apparatus is a mobile telephone.

8. The protective pivotable flip according to claim 6, wherein the customization element is a card.

9. The protective pivotable flip according to claim 6, wherein the customization element is a sticker.

10. The protective pivotable flip according to claim 6, wherein the first portion includes opposing lateral hook-shaped edges that define slots for receiving corresponding edges of the second portion.

* * * * *